(12) United States Patent
Perry (10) Patent No.: US 8,365,717 B1
(45) Date of Patent: Feb. 5, 2013

(54) BARBECUE ACCESSORY AND METHOD OF USE

(76) Inventor: Phillip E. Perry, Vacaville, CA (US)

( * ) Notice: Subject to any disclaimer, the term of this patent is extended or adjusted under 35 U.S.C. 154(b) by 506 days.

(21) Appl. No.: 12/590,480

(22) Filed: Nov. 9, 2009

Related U.S. Application Data (60) Provisional application No. 61/114,936, filed on Nov. 14, 2008.

(51) Int. Cl.
*F23H 17/12* (2006.01)

(52) U.S. Cl. .......... 126/168; 126/9 R; 126/9 B; 126/29; 126/27; 126/30; 126/161; 126/166; 126/152 B; 211/85.31; 211/112; 211/126.8; 211/133.2; 211/181.1

(58) Field of Classification Search .......... 126/27, 126/29, 30, 9 B, 9 R, 161, 166, 168, 152 B; 211/112, 126.8, 133.2, 181.1, 85.31; 248/107, 248/153, 175
See application file for complete search history.

(56) References Cited

U.S. PATENT DOCUMENTS

| | | | | |
|---|---|---|---|---|
| 1,499,665 A * | 7/1924 | Kaufman | 220/485 |
| 2,080,592 A * | 5/1937 | Zickler | 126/376.1 |
| 2,488,014 A * | 11/1949 | Higman | 126/59 |
| 2,636,656 A * | 4/1953 | Tanabe | 141/314 |
| 2,780,162 A * | 2/1957 | Chaplik | 99/306 |
| 3,035,566 A * | 5/1962 | Keeney | 126/25 R |
| 3,073,263 A * | 1/1963 | Wynkoop | 126/25 B |
| 3,123,062 A * | 3/1964 | Psarris | 126/25 B |
| 3,216,379 A * | 11/1965 | Durfee | 126/25 B |
| 3,217,634 A * | 11/1965 | Fox | 99/339 |
| 3,228,319 A * | 1/1966 | Miller | 99/389 |
| 3,316,892 A * | 5/1967 | Hanke | 126/25 R |
| 3,731,429 A * | 5/1973 | Orthman | 47/47 |
| 4,131,108 A * | 12/1978 | Bauder | 126/298 |
| 4,257,391 A * | 3/1981 | Carin | 126/163 R |
| 4,296,726 A * | 10/1981 | Ross et al. | 126/25 B |
| 4,631,861 A * | 12/1986 | Wuthrich | 47/70 |
| 4,651,708 A * | 3/1987 | Groeneweg | 126/30 |
| 4,688,549 A * | 8/1987 | Blankemeyer et al. | 126/373.1 |
| 4,746,022 A * | 5/1988 | Benham | 211/195 |
| 4,762,056 A * | 8/1988 | Virag | 99/345 |
| 4,850,333 A * | 7/1989 | Dellrud et al. | 126/25 A |
| 5,070,777 A * | 12/1991 | Novak | 99/482 |
| 5,127,184 A * | 7/1992 | Cosentino | 47/41.01 |
| 5,154,159 A * | 10/1992 | Knafelc et al. | 126/25 R |
| 5,195,424 A * | 3/1993 | Guajaca | 99/418 |
| 5,197,455 A * | 3/1993 | Tessien | 126/25 B |
| 5,450,691 A * | 9/1995 | Christie et al. | 47/83 |
| 5,469,835 A * | 11/1995 | Stephen et al. | 126/25 B |
| 5,722,390 A * | 3/1998 | Hannebaum | 126/541 |
| 5,950,614 A * | 9/1999 | Guinnane | 126/25 R |
| 6,237,882 B1 * | 5/2001 | DiMuzio | 248/175 |
| 6,591,544 B1 * | 7/2003 | Christian | 43/100 |
| 6,598,598 B1 * | 7/2003 | Bratsikas | 126/25 R |
| 6,688,301 B1 | 2/2004 | McNeill | |
| D497,772 S * | 11/2004 | Bodum | D7/417 |
| 6,883,514 B1 * | 4/2005 | Felicitas et al. | 99/388 |
| 6,892,895 B2 * | 5/2005 | Zhu et al. | 220/489 |
| 7,032,587 B2 * | 4/2006 | McNeill | 126/25 B |
| 7,204,864 B2 * | 4/2007 | Stephens | 44/530 |
| 7,287,463 B2 * | 10/2007 | Ko et al. | 99/339 |

(Continued)

*Primary Examiner* — Kenneth Rinehart
*Assistant Examiner* — Jorge Pereiro
(74) *Attorney, Agent, or Firm* — Ted Masters (57) ABSTRACT

An accessory for a barbecue includes a plurality of frames which are arranged in vertically spaced apart relationship and form an array having an outer perimeter and a central cavity. The array is placed on the solid fuel support of the barbecue, and solid fuel such as charcoal is placed around the outer perimeter of the array. The accessory has a base upon which a container is placed to collect juices from the cooking food.

2 Claims, 5 Drawing Sheets

U.S. PATENT DOCUMENTS

| | | | |
|---|---|---|---|
| 2003/0234014 A1* | 12/2003 | Fitzgerald | 126/25 R |
| 2004/0200359 A1* | 10/2004 | Snider | 99/446 |
| 2005/0092190 A1* | 5/2005 | Ko et al. | 99/450 |
| 2005/0160664 A1* | 7/2005 | Stephens | 44/530 |
| 2005/0229916 A1* | 10/2005 | Fitzgerald | 126/25 R |
| 2006/0011192 A1* | 1/2006 | Citrynell et al. | 126/25 R |
| 2006/0076004 A1* | 4/2006 | Yarder et al. | 126/152 B |
| 2006/0213497 A1* | 9/2006 | Orozco et al. | 126/41 R |
| 2007/0119444 A1* | 5/2007 | Yoon et al. | 126/25 B |
| 2008/0168975 A1* | 7/2008 | Chang | 126/19.5 |
| 2009/0139511 A1* | 6/2009 | Dalrymple | 126/25 R |
| 2009/0148801 A1* | 6/2009 | Wedermann | 432/14 |

* cited by examiner

BARBECUE ACCESSORY AND METHOD OF USE

CROSS REFERENCE TO RELATED APPLICATION

This application claims the filing benefit under 35 U.S.C. §119(e) of U.S. Provisional Application No. 61/114,936, filed Nov. 14, 2008, which is hereby incorporated by reference.

TECHNICAL FIELD

The present invention pertains generally to cooking with solid fuel such as charcoal, and more particularly to a barbecue accessory which is placed within the barbecue to provide both direct and indirect heat.

BACKGROUND OF THE INVENTION

A barbecue (sometimes spelled barbeque) is a device used to cook food over an open fire. The barbecue is typically loaded with solid fuel such as charcoal or hardwood, the fuel is ignited, and the food is placed on a grill over the burning solid fuel. Alternatively, the cooking may be indirect by using the smoke from the solid fuel.

BRIEF SUMMARY OF THE INVENTION

The present invention is directed to a barbecue accessory which is used with a barbecue of the grill type. The invention enables both direct and indirect cooking, simultaneously or independently. The accessory includes an array of spaced apart parallel frames which has a central cavity. The array creates a dam like barrier which prevents the solid fuel from entering the center of the grill, thereby enabling indirect cooking on the middle of the grill and direct cooking at the outer edge of the grill were the fuel burns hotter. The accessory is placed on the solid fuel support (fuel grill) of the barbecue. Solid fuel such as charcoal, wood chips, or the like is then placed around the outer perimeter of the array.

In an embodiment of the invention, a base is connected to the bottom of the array, and acts as a guide to prevent off center placement of the accessory within the grill. A container such as a drip pan is placed on the base to collect juices from the cooking food. During the cooking process the juices from the food drip into the container, heat up, vaporize, and bathe the food being cooked on the grill. The container can also be filled with water or a preference of flavors that will be absorbed by the food cooking on the grill. This method of cooking also provides moisture to the heated air inside the barbecue so that the food remains moist and juicy even if overcooked. The container can also be used to steam vegetables and roasts potatoes. The base also acts as a spacer to prevent the removable container from coming in contact with the fuel grate thereby preventing over cooking or scorching of the liquid within the container.

The invention is set in place on the fuel grill of the barbecue, and solid fuel is then added around the outer edge between the invention and the body of the barbecue. The solid fuel is then ignited. Once the solid fuel has reached its optimum temperature the container is installed on the base and is partially filled with water or seasonings. The food grate is then installed on the barbecue. The food of choice to be cooked indirectly is then set in the center of the grill grate directly over the container. Large items such as whole chickens and turkeys can be indirectly cooked to perfection without worry, burning or turning, since the food being cooked is receiving heat from several directions. Once the lid has been replaced on the grill, the food begins to cook and the juices start to drip into the container. The drippings from the food being cooked fall into the heated container and evaporate, rise, and flavor the food on the grill. Food is cooked evenly without the worry of burning on one side or the other. This arrangement also eliminates the need to constantly turn the food to prevent burning. Any foods that tend to dry out when cooked, such as pork or chicken, greatly benefit from the ability of this apparatus to cook indirectly and to provide added moisture while cooking. Once the food has completed the cooking process and removed from the food grate, the grate is removed and the juices within the container are retrieved and used for gravy or dipping.

Advantages of the present invention include:
  The invention improves the cooking process by providing areas of both direct and indirect heat on the barbecue grill. As such, some foods may be cooked directly, while other food is simultaneously cooked indirectly.
  The indirect cooking feature allows for the cooking of nontraditional foods not generally cooked within a barbecue; such as biscuits, breads and pizza.
  The direst cooking surface allows cooking directly over the heat for searing or quick cooking. Once the food has reached the desired temperature it is then moved from the outer edge away from the direct heat to the middle to keep the food warm.
  The convection atmosphere allows the chef to cook the food for the required time without ever lifting the lid of the cooker or displacing the food on the grill, no flipping or turning is required.
  The present invention uses spaced apart frames so that air can flow freely around the solid fuel within the barbecue to provide and sustain an even cooking temperature.
  The accessory can also be used to bake, steam, smoke and boil. It works with all types of indoor and outdoor grills of every shape and size.

In accordance with a preferred embodiment of the invention, a barbecue accessory is used with a barbecue having a solid fuel support for receiving pieces of solid fuel. The barbecue accessory includes a plurality of frames which are arranged in vertically spaced apart relationship and form an array which has an outer perimeter and a central cavity. The array is shaped and dimensioned to be positionable upon the solid fuel support so that the pieces of solid fuel may be disposed around the outer perimeter of the array.

In accordance with an aspect of the invention, each frame of the plurality of frames is a different size, and includes a largest frame and a smallest frame. The largest frame is the bottom frame of the array, and the smallest frame is the top frame of the array. All other frames are disposed between the largest frame and the smallest frame in increasing size from the smallest frame to the largest frame.

In accordance with another aspect of the invention, each frame of the plurality of frames has the same shape.

In accordance with another aspect of the invention, each frame of the plurality of frames is circular.

In accordance with another aspect of the invention, the plurality of frames define spaces therebetween, the spaces being too small to pass the pieces of solid fuel.

In accordance with another aspect of the invention, at least one spacer connects the plurality of frames together in spaced apart parallel relationship to form the array.

In accordance with another aspect of the invention, the array has a bottom frame, and a base is connected to the bottom frame. The base includes a plurality of protrusions which outwardly project past the bottom frame, and which serve to centrally align the array on the solid fuel support.

In accordance with another aspect of the invention, the base is y-shaped and includes three legs.

In accordance with another aspect of the invention, a container is positionable within the central cavity of the array.

In accordance with another aspect of the invention, the base includes a plurality of vertically projecting stops which hold the container centered within the central cavity of the array.

Other aspects of the present invention will become apparent from the following detailed description, taken in conjunction with the accompanying drawings, which illustrate, by way of example, the principles of the invention.

DETAILED DESCRIPTION OF THE INVENTION

Figure 1:
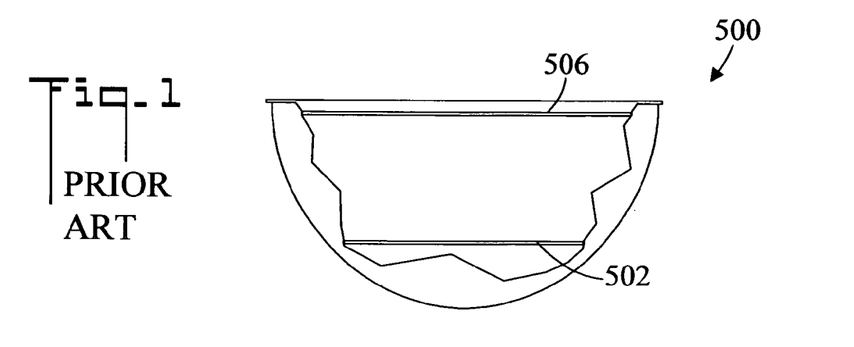
FIG. 1 is a cutaway side elevation view of a prior art barbecue.

Referring initially to FIG. 1, there is illustrated a cutaway side elevation view of a prior art barbecue 500. Barbecue 500 has a solid fuel support 502 for receiving pieces of solid fuel 504 (refer also to FIGS. 12-14 and the associated discussions). Solid fuel support 502 is typically a grate which is located in the lower part of barbecue 500. The solid fuel 504 can be charcoal, wood, wood chips, or other combustible material. Barbecue 500 further includes a food grate 506 which is located near the top, and which receives the food to be cooked. It may be appreciated that barbecue 500 can take many forms in addition to the shown kettle grill, and can embrace a variety of cooking devices such as grills, spits, pits, and the like.

Figure 2:
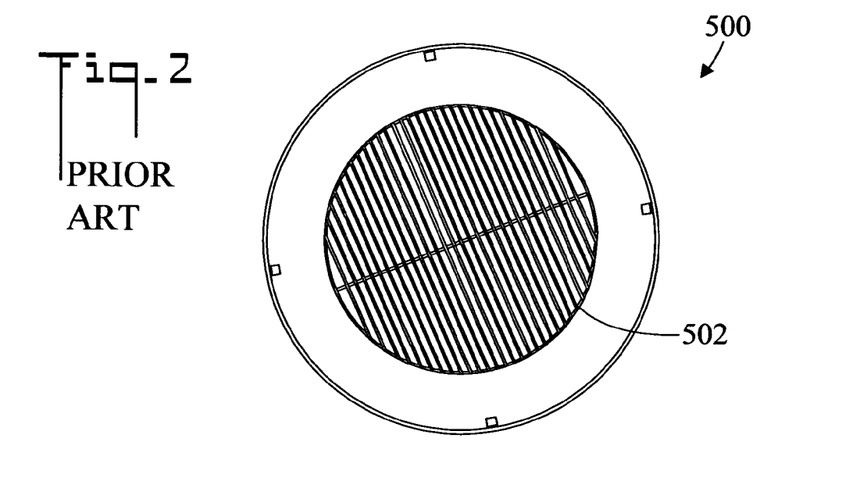
FIG. 2 is a top plan view of the prior art barbecue with a food grate removed.

FIG. 2 is a top plan view of prior art barbecue 500 with food grate 506 removed, thereby showing solid fuel support 502.

Figure 3:
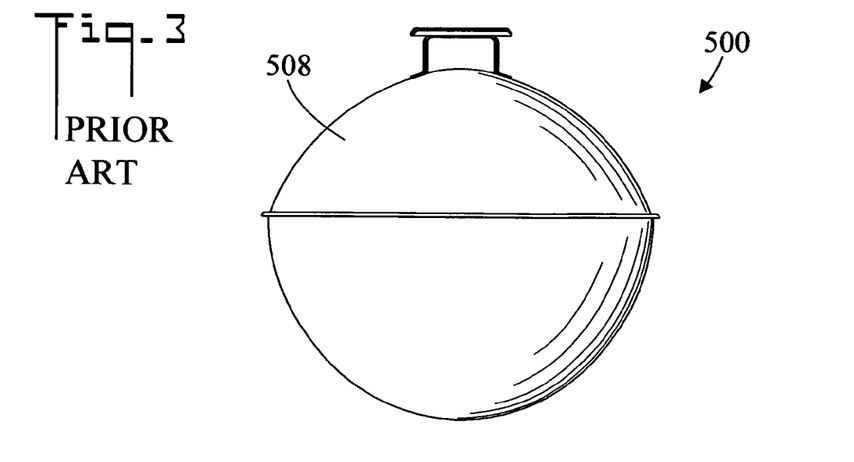
FIG. 3 is a side elevation view of the prior art barbecue with a cover in place.

FIG. 3 is a side elevation view of prior art barbecue 500 with a cover 508 in place. Cover 508 retains heat within barbecue 500 and thereby accelerates the cooking process.

Figures 4, 5, 6, 7:
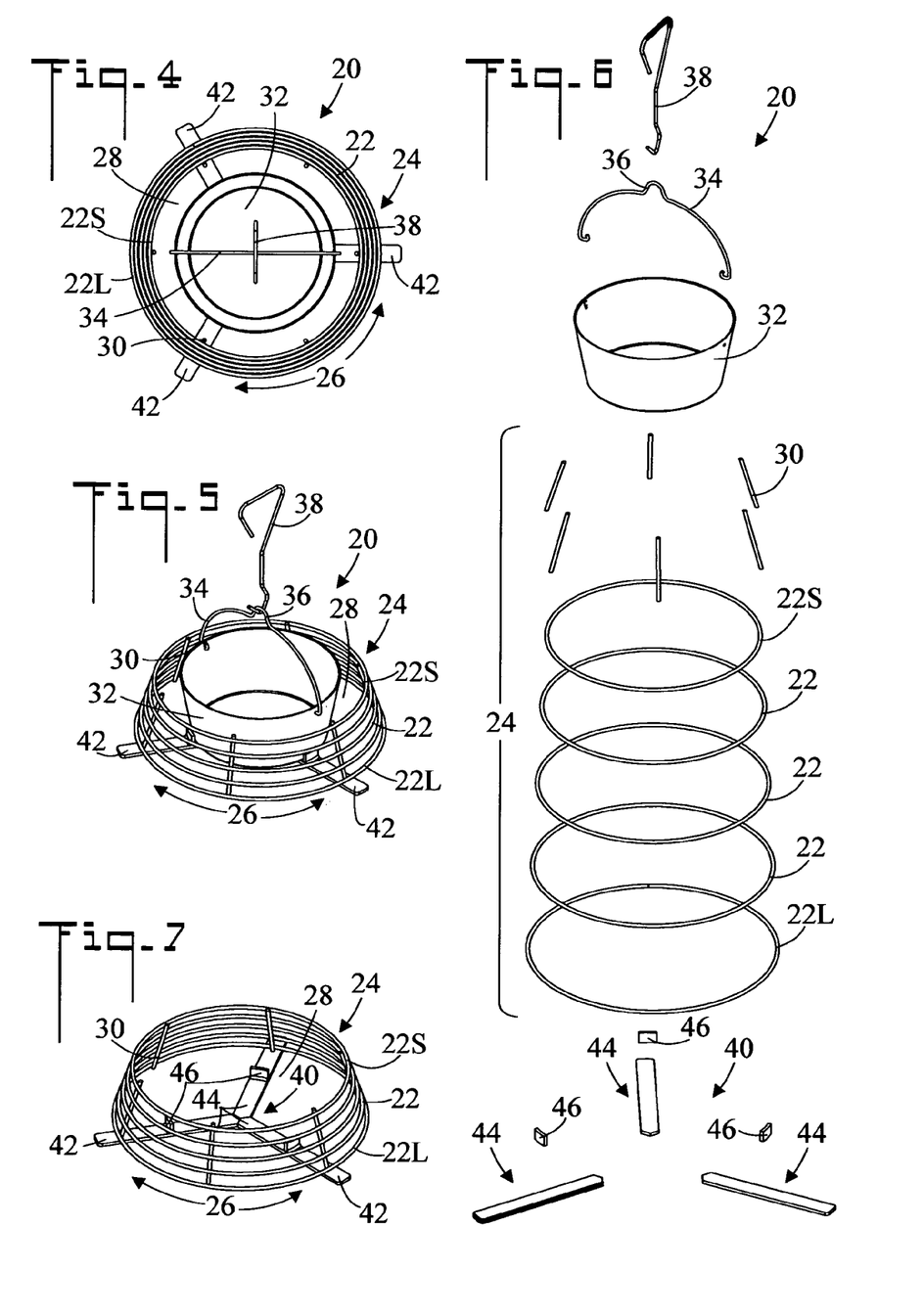
FIG. 4 is a top plan view of a barbecue accessory in accordance with the present invention.
FIG. 5 is a perspective view of the barbecue accessory.
FIG. 6 is an exploded view of the barbecue accessory.
FIG. 7 is a perspective view of an array of frames and a base.

FIGS. 4-6 are top plan, perspective, and exploded views respectively of a barbecue accessory in accordance with the present invention, generally designated as 20. FIG. 7 is a perspective view of an array of frames and a base. Barbecue accessory 20 includes a plurality of planar frames 22 (five in the shown embodiment) which are arranged in a vertically spaced apart relationship and form an array 24 which has an outer perimeter 26 and a central cavity 28. Array 24 is shaped and dimensioned to be positionable upon the solid fuel support 502 of barbecue 500 so that the pieces of solid fuel 504 may be disposed around outer perimeter 26 of array 24 (refer also to FIGS. 10-14 and the associated discussions). In the shown embodiment, frames 22 are fabricated from metal rods which have been bent into a closed planar circular shape. In the shown embodiment, each of the frames 22 has the same shape (circular as shown). However it may be appreciated that other shapes such as oval, and polygon (rectangular, hexagonal, octagonal, etc.), or irregular can be utilized, depending upon the shape of barbecue 500. Also, array 24 could have frames 22 having different shapes.

In the shown embodiment, each frame 22 of the plurality of frames is a different size, and includes a largest frame 22L and a smallest frame 22S. Largest frame 22L is the bottom frame of array 24, and smallest frame 22S is the top frame of array 24. All other frames 22 are disposed between largest frame 22L and smallest frame 22S in increasing size from smallest frame 22S to largest frame 22L. That is, all frames 22 are vertically arranged by size with the smallest frame 22S being at the top of array 24, and the largest frame 22L being at the bottom of array 24. This gives array 24 the general appearance of a truncated cone, and permits more solid fuel 504 to be stacked around outer perimeter 26 of array 24 (refer to FIGS. 12-14).

At least one spacer 30 (six in the shown embodiment) connects (such as by welding) the plurality of frames 22 together in spaced apart parallel relationship to form array 24. The size of barbecue 500 dictates the size of frames 22 and array 24, and also the number of spacers 30 which are required to hold frames 22 together in array 24.

A container 32, such as a pot or a pan, is positionable within central cavity 28 of array 24. Container 32 is shaped and dimensioned to fit within central cavity 28. Container 32 serves as a juice recovery system which collects juices which drip from cooking food, and allows retrieval of the juices after cooking. Vapors rising from the juices in container 32 additionally keep the cooking food moist, and imparts flavor to the food. Container 32 has an handle 34 which rests on its upper rim. Handle 34 has a loop 36 which prevents handle 34 from falling within container 32, and also provides an attachment point for a lifting arm 38 which is used to lift hot container 32. The juices recovered from container 32 can be used to make gravy.

Array 24 has a bottom frame 22 (which in the shown embodiment is the largest frame 22L). A base 40 (refer to FIGS. 6 and 7) is connected to bottom frame 22 of array 24. Base 40 includes a plurality of protrusions 42 which outwardly project past bottom frame 22, and which serve to centrally align array 24 on solid fuel support 502 (refer to FIGS. 10-14). In the shown embodiment, base 40 is y-shaped and includes three legs 44. Base 40 further includes a plurality of vertically projecting stops 46 which hold container 32 centered within central cavity 28 of array 24. This prevents container 32 from getting too close to the hot solid fuel 502 and scorching the juices collected from the cooking food.

Figure 8:
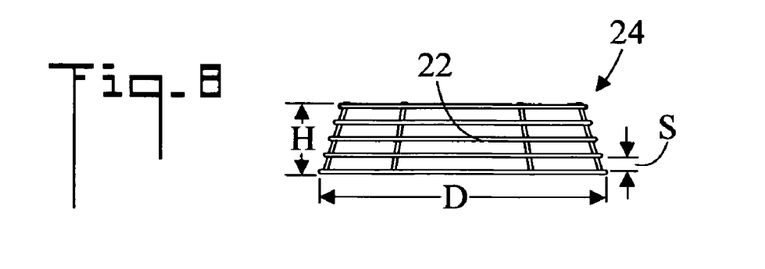
FIG. 8 is a side elevation view of the array.
Figure 9:
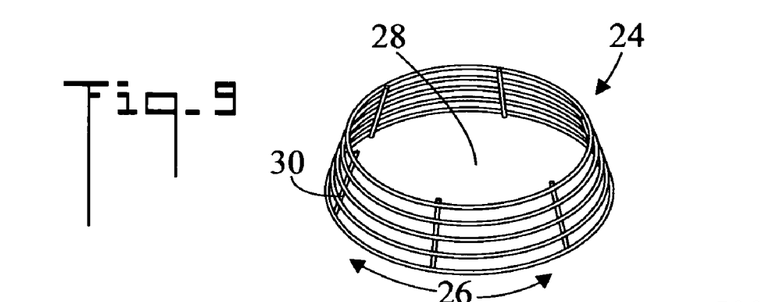
FIG. 9 is a perspective view of the array.

Now referring to FIGS. 8 and 9, there are illustrated side elevation and perspective views respectively of the plurality of spaced apart parallel frames 22 forming array 24. The plurality of frames 22 define spaces S therebetween, wherein spaces S are too small to pass the pieces of solid fuel 502 (refer to FIGS. 12-14). In the shown embodiment, the spaces S between frames 22 are all equal, however it may be appreciated that irregular spacing could also be employed. In an embodiment of the invention, array 24 may be used without base 40 and container 32.

Figure 10:
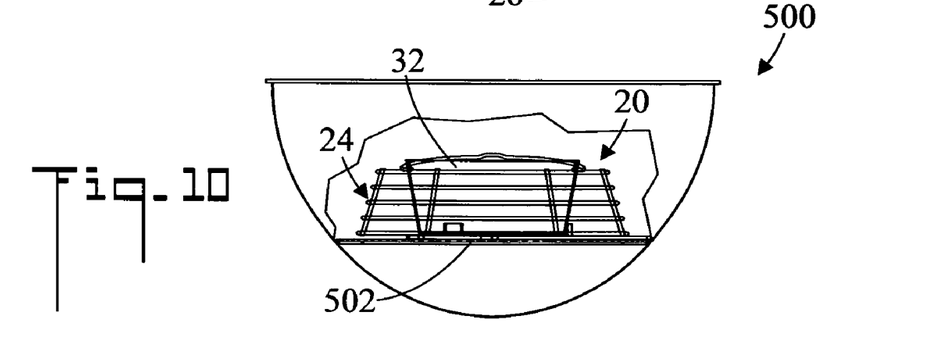
FIG. 10 is a cutaway side elevation view of the barbecue accessory installed in the prior art barbecue.
Figure 11:
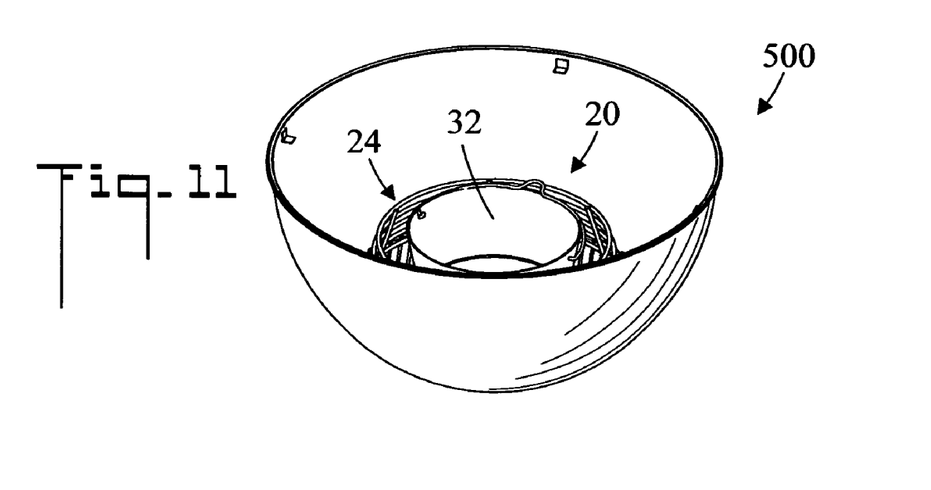
FIG. 11 is a perspective view of the barbecue accessory installed in the prior art barbecue.

FIGS. 10 and 11 are cutaway side elevation and perspective views respectively of barbecue accessory 20 installed in the prior art barbecue 500. Barbecue accessory 20 is placed and centered upon solid fuel support 502. While container 32 is shown in place, it is noted that container 32 is typically added after solid fuel 504 reaches the desired temperature (refer to FIGS. 12-14).

Figure 12:
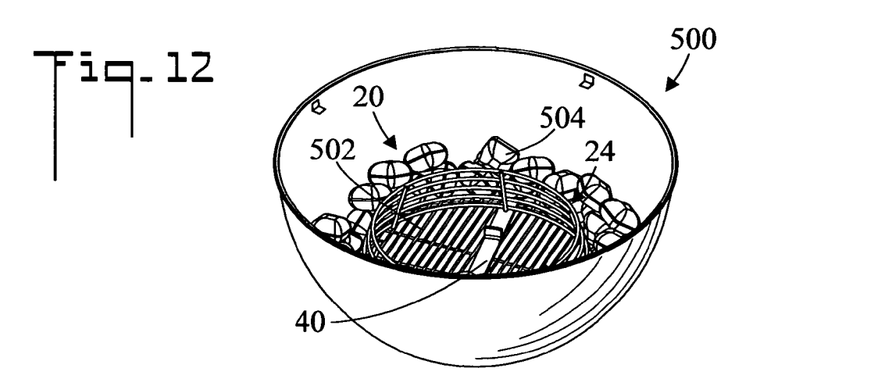
FIG. 12 is a perspective view of the array and base installed in the prior art barbecue with solid fuel placed around the outer perimeter of the array.
Figure 13:
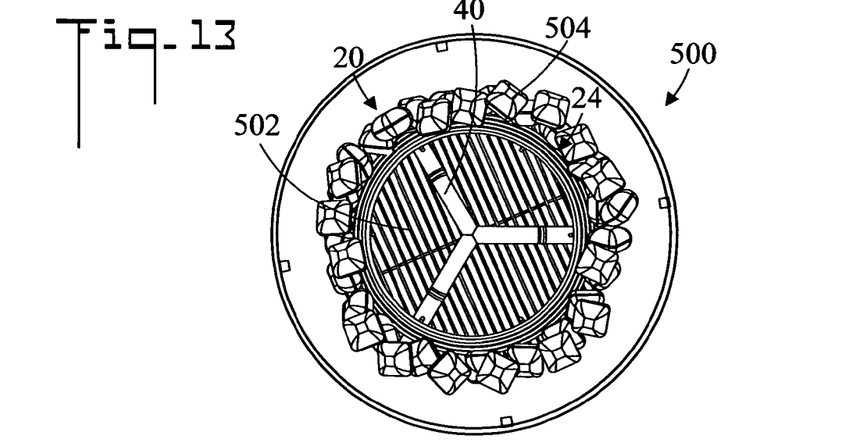
FIG. 13 is a top plan view of the array and base installed in the prior art barbecue with solid fuel placed around the outer perimeter of the array.

FIGS. 12 and 13 are perspective and top plan views respectively of array 24 and base 40 installed in prior art barbecue 500 with solid fuel 504 (charcoal briquettes as shown) placed around outer perimeter 26 (refer to FIG. 4) of array 24. After placement around array 24, solid fuel 504 is ignited. Also referring to FIGS. 4-9, spaced apart frames 22 allow air to freely flow around solid fuel 504 within barbecue 500, and create (1) a sustained and even burn, and (2) a convection atmosphere which cooks the food evenly.

Figure 14:
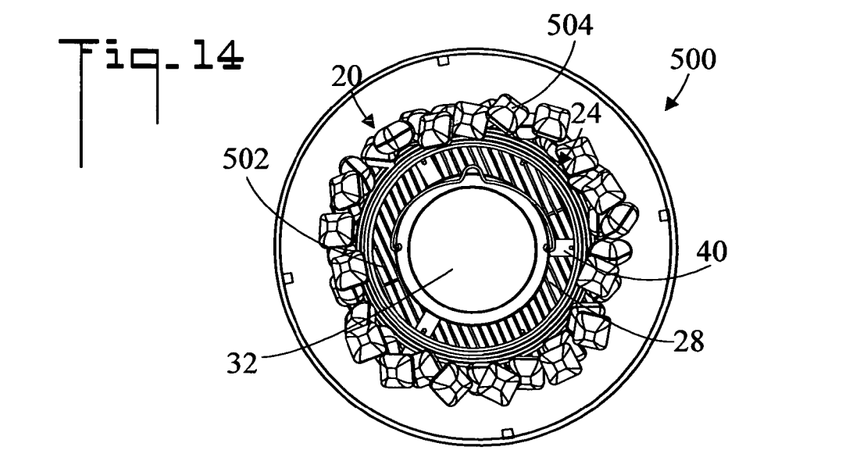
FIG. 14 is a top plan view as in FIG. 13 with a container placed within a central cavity of the array.

FIG. 14 is a top plan view as in FIG. 13 with container 32 placed within central cavity 28 of array 24. When solid fuel 504 has reached the preferred temperature container 32 is installed on base 40. Also referring to FIGS. 6 and 7, stops 46 hold container 32 centered within central cavity 28 of array 24. Food grate 506 (refer to FIG. 1) is then placed on barbecue 500, and food is placed on food grate 506. Cover 508 (refer to FIG. 1) can then be placed on barbecue 500 to accelerate the cooking process.

Figure 15:
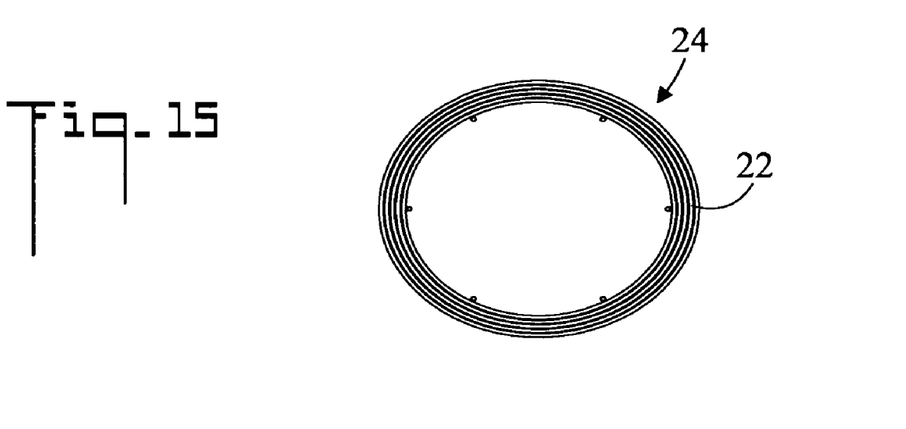
FIG. 15 is a top plan view of a second embodiment of the array.
Figure 16:
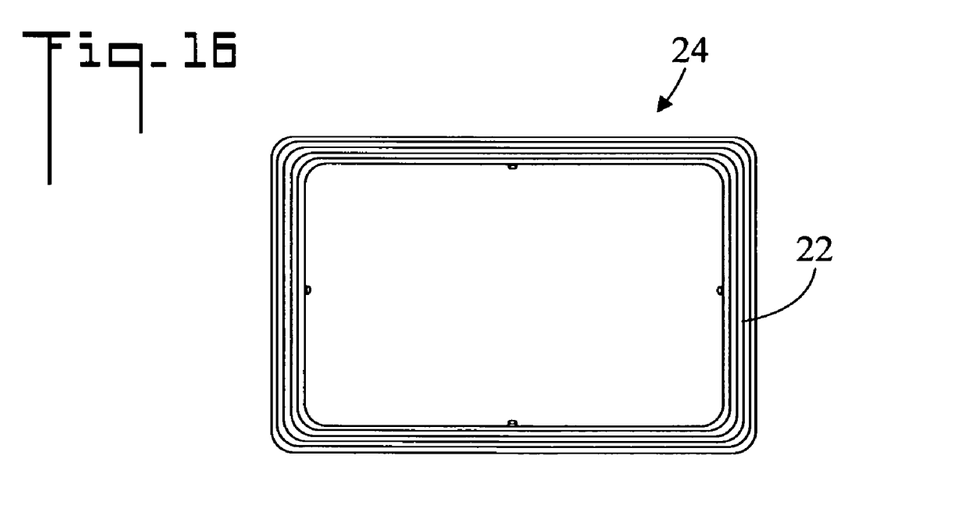
FIG. 16 is a top plan view of a third embodiment of the array.

FIG. 15 is a top plan view of a second embodiment of array 24 in which frames 22 are oval, and FIG. 16 is a top plan view of a third embodiment of the array 24 in which frames 22 are rectangular. It may be appreciated that array 24 can assume any convenient shape to best fit the shape of prior art barbecue 500.

In terms of use, a method for barbecuing includes:
(a) providing a barbecue 500 having a solid fuel support 502 for receiving pieces of solid fuel 504 and a food grate 506 for receiving food;
(b) providing pieces of solid fuel 504;
(c) providing food;
(d) providing a barbecue accessory 20 including;
a plurality of frames 22;
the plurality of frames 22 arranged in a vertically spaced apart relationship and forming an array 24 having an outer perimeter 26 and a central cavity 28;
array 24 shaped and dimensioned to be positionable upon solid fuel support 502 so that the pieces of solid fuel 504 may be disposed around outer perimeter 26 of array 24;
a container 32 positionable within central cavity 28 of array 24;
(e) removing food grate 506 from barbecue 500;
(f) placing array 24 on solid fuel support 502;
(g) placing pieces of solid fuel 504 on solid fuel support 502 around outer perimeter 26 of array 24;
(h) igniting the pieces of solid fuel 502 and letting them burn for a desired period of time;
(i) placing container 32 in central cavity 28 of array 24;
(j) placing food grate 506 on barbecue 500;
(k) placing food on food grate 506; and,
(l) allowing the food to cook.
The method further including:
in step (d), each frame 22 of the plurality of frames 22 being a different size;
in step (d), plurality of frames 22 including a largest frame 22L and a smallest frame 22S;
in step (d), array 24 including (1) largest frame 22L being the bottom frame 22 of array 24, (2) smallest frame 22S being the top frame 22 of array 24, and (3) all other frames 22 disposed between largest frame 22L and smallest frame 22S in increasing size from smallest frame 22S to largest frame 22L; and,
in step (f), positioning array 24 so that largest frame 22L is adjacent solid fuel support 502.

The method further including:
in step (d), array 24 having a bottom frame 22;
in step (d), a base 40 connected to the bottom frame 22 of array 24;
in step (d), base 40 including a plurality of protrusions 42 which outwardly project past the bottom frame 22, and which serve to centrally align array 24 on solid fuel support 502; and
in step (f), using protrusions 42 to centrally align array 24 on solid fuel support 502.

The method further including:
in step (d), array 24 having a bottom frame 22;
in step (d), a base 40 connected to the bottom frame 22 of array 24;
in step (d), base 40 including a plurality of vertically projecting stops 46 which hold container 32 centered within central cavity 28 of array 24; and,
in step (i), stops 46 holding container 32 centered within central cavity 28 of array 24.

The method further including:
providing at least one of water and a flavoring;
in step (i), placing at least one of the water and the flavoring in container 32 so that the water and the flavoring will be absorbed by the food.

The method further including:
in step (k), doing at least one of (1) placing food over solid fuel 504, and (2) placing food over central cavity 28 of array 24, wherein food placed over central cavity 28 of array 24 cooks slower than food placed over solid fuel 504.

The preferred embodiments of the invention described herein are exemplary and numerous modifications, variations, and rearrangements can be readily envisioned to achieve an equivalent result, all of which are intended to be embraced within the scope of the appended claims.

I claim:
1. A barbecue accessory for a barbecue having a solid fuel support for receiving pieces of solid fuel, said barbecue accessory cooperating with a container, said barbecue accessory comprising:
a plurality of frames;
said plurality of frames arranged in vertically spaced apart relationship and forming an array having an outer perimeter and a central cavity, the container positionable within said central cavity of said array;
said array shaped and dimensioned to be positionable upon the solid fuel support so that the pieces of solid fuel are placeable around said outer perimeter of said array;
said array having a bottom frame;
a base connected to said bottom frame of said array; and,
said base including a plurality of vertically projecting stops which hold the container centered within said central cavity of said array.
2. A barbecue accessory for a barbecue having a solid fuel support for receiving pieces of solid fuel, said barbecue accessory comprising:
a plurality of frames;

said plurality of frames arranged in vertically spaced apart relationship and forming an array having an outer perimeter and a central cavity;
said array shaped and dimensioned to be positionable upon the solid fuel support so that the pieces of solid fuel are placeable around said outer perimeter of said array;
a container positionable within said central cavity of said array;
each frame of said plurality of frames being of a different size;
said plurality of frames including a largest frame and a smallest frame;
said array including (1) said largest frame being a bottom frame of said array, (2) said smallest frame being a top frame of said array, and (3) all other said frames disposed between said largest frame and said smallest frame in increasing size from said smallest frame to said largest frame;
each frame of said plurality of frames having the same shape;
each said frame of said plurality of frames being circular;
said plurality of frames defining spaces therebetween;
said spaces being too small to pass the pieces of solid fuel;
at least one spacer which connects said plurality of frames together in spaced apart parallel relationship to form said array;
a base connected to said bottom frame of said array;
said base including a plurality of protrusions which outwardly project past said bottom frame, and which serve to centrally align said array on the solid fuel support;
said base being y-shaped and including three legs;
a container positionable within said central cavity of said array; and,
said base including a plurality of vertically projecting stops which hold said container centered within said central cavity of said array.

* * * * *